US012812213B2

(12) United States Patent
Iwasaki et al.

(10) Patent No.: US 12,812,213 B2
(45) Date of Patent: Nov. 24, 2026

(54) VIDEO DISTRIBUTION SYSTEM

(71) Applicant: TOYOTA JIDOSHA KABUSHIKI KAISHA, Aichi-ken (JP)

(72) Inventors: Takahiro Iwasaki, Kiyose (JP); Yuta Mori, Urayasu (JP); Koki Sone, Tokyo-to (JP); Bing Xue, Tokyo-to (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/983,351

(22) Filed: Dec. 17, 2024

(65) Prior Publication Data

US 2025/0211827 A1 Jun. 26, 2025

(30) Foreign Application Priority Data

Dec. 22, 2023 (JP) ................................ 2023-217203

(51) Int. Cl.
*H04N 21/472* (2011.01)
*H04N 21/2187* (2011.01)
*H04N 21/266* (2011.01)
*H04N 21/431* (2011.01)

(52) U.S. Cl.
CPC ... *H04N 21/47214* (2013.01); *H04N 21/2187* (2013.01); *H04N 21/266* (2013.01); *H04N 21/431* (2013.01)

(58) Field of Classification Search
CPC ......... H04N 21/47214; H04N 21/2187; H04N 21/266; H04N 21/431
See application file for complete search history.

(56) References Cited

U.S. PATENT DOCUMENTS

2002/0083468 A1* 6/2002 Dudkiewicz ....... H04N 21/4755 348/473
2003/0051256 A1 3/2003 Uesaki et al.
2007/0083895 A1* 4/2007 McCarthy .......... H04N 21/4622 348/E7.071
2009/0042607 A1 2/2009 Adachi et al.
2017/0347068 A1 11/2017 Kusumoto
2019/0110085 A1* 4/2019 Evans ................ H04N 21/4882
2019/0268645 A1* 8/2019 Fuetsch .............. H04N 21/8456

FOREIGN PATENT DOCUMENTS

JP 2003-179908 A 6/2003
JP 2008-187505 A 8/2008
JP 2017-212682 A 11/2017
JP 2022-069033 A 5/2022
JP 2023-048165 A 4/2023
WO 2007/004392 A1 1/2007

* cited by examiner

*Primary Examiner* — Nicholas T Corbo
(74) *Attorney, Agent, or Firm* — HAUPTMAN HAM, LLP

(57) ABSTRACT

A video distribution system distributes a video of an area where a target is present. the video distribution system configured to provide a notification and selection request information to a user terminal, when a specific condition is satisfied. The selection request information presents a plurality of options including viewing the video live and viewing the video later in a recorded form to a user. The video distribution system distributes the video live to the user terminal when the user selects the viewing the video live. The video distribution system enables the user to flexibly select one of the plurality of options depending on the user's own situation.

4 Claims, 6 Drawing Sheets

1:Video distribution system

100: Management device

VIDEO DISTRIBUTION SYSTEM

CROSS-REFERENCE TO RELATED APPLICATION

This application claims priority to Japanese Patent Application No. 2023-217203 filed on Dec. 22, 2023, the entire contents of which are incorporated by reference herein.

TECHNICAL FIELD

The present disclosure relates to a video distribution system that distributes a video of an area where a target is present.

BACKGROUND ART

Patent Literature 1 discloses an image output device. When a predetermined event occurs, the image output device outputs a captured image if the predetermined event still continues at the time of receiving an output instruction. When the predetermined event does not continue at the time of receiving the output instruction, the image output device outputs an image captured while the predetermined event continues.

LIST OF RELATED ART

Patent Literature 1: Japanese Laid-Open Patent Application No. 2017-212682

SUMMARY

A video distribution system that distributes a video of an area where a target is present will be considered. When a specific event occurs in a captured video, a user of the video distribution system can view the video. However, the user is not always in a situation where he or she can view the video when the specific event occurs.

A purpose of the present disclosure is to provide a video distribution system that enables a user to flexibly select a viewing style in accordance with the user's own situation at the time when a specific event occurs.

A first aspect relates to a video distribution system that distributes a video of an area where a target is present.

the video distribution system includes processing circuitry.

processing circuitry configured to:

when a specific viewing recommendation condition is satisfied, provide a notification indicating that the specific viewing recommendation condition is satisfied to a user terminal of a user;

provide selection request information to the user terminal in conjunction with providing the notification, wherein the selection request information presents a plurality of options including viewing the video live and viewing the video later in a recorded form; and distribute the video live to the user terminal when a user response indicating selection of the viewing the video live is received from the user terminal.

According to the present disclosure, when the viewing recommendation condition is satisfied, the selection request information is provided to the user terminal in conjunction with the notification. Then, the user can flexibly select viewing the video live or later in the recorded form by the user response, depending on the user's own situation at that time. This improves the convenience for the user.

DETAILED DESCRIPTION

Embodiments of the present disclosure will be described with reference to the drawings. In the present embodiment, it is assumed that a "target" is a "child in school", an "area where the target exists" is a "school classroom", and a "user" is a "guardian of the child (target)". However, the scope of the present disclosure is not limited to the present embodiment.

1. Video Distribution System 1-1. Overall Video Distribution System

Figure 1:
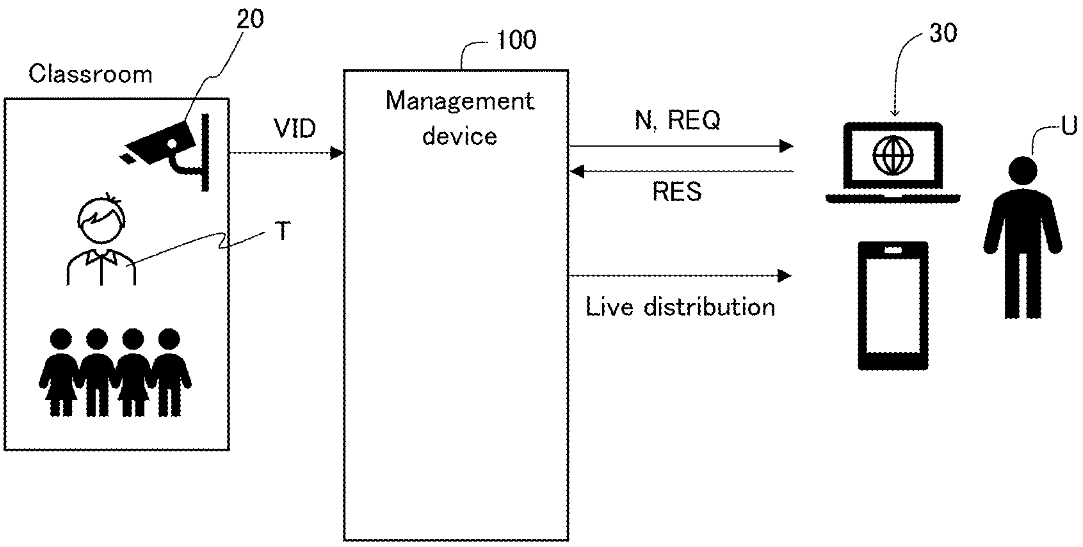
FIG. 1 is a schematic diagram showing an example of a configuration of a video distribution system.

FIG. 1 is a schematic diagram showing a configuration example of a video distribution system 1. The video distribution system 1 includes a camera 20, a user terminal 30, and a management device 100.

The camera 20 is installed in a school classroom and captures the entire classroom where the target T is present. A plurality of cameras 20 may be installed in one classroom. The camera 20 may be installed in each classroom in a school.

The user terminal 30 is an information terminal owned by the user U. The user terminal 30 includes a user interface that presents information to the user U and receives an input by the user U. The user interface is exemplified by a touch panel. The user terminal 30 and the management device 100 can communicate with each other via a wireless or wired communication network. Specific examples of the user terminal 30 include a smartphone, a tablet, a PC, etc.

The management device 100 manages the video distribution system 1. Typically, the management device 100 is a management server on a cloud. The management device 100 may be configured by a plurality of servers that perform distributed process.

The management device 100 communicates with the camera 20, and constantly collects and manages the video VID captured by the camera 20. When a viewing recommendation condition described later is satisfied, the management device 100 provides the user terminal 30 with a notification N indicating that the viewing recommendation condition is satisfied. The management device 100 provides selection request information REQ to the user terminal 30 in conjunction with the provision of the notification N. The selection request information REQ presents a plurality of options including viewing the video VID live or viewing the video VID later in a recorded form. The user terminal 30 presents the notification N and the selection request information REQ to the user U through the user interface. The user U inputs a user response RES to the selection request information REQ through the user interface. The user terminal 30 transmits a user response RES, indicating what the user U inputs, to the management device 100. When the user response RES intends "live viewing", the management device 100 that has received the user response RES distributes the video VID live to the user terminal 30.

1-2. Condition Determination Process

Figure 2:
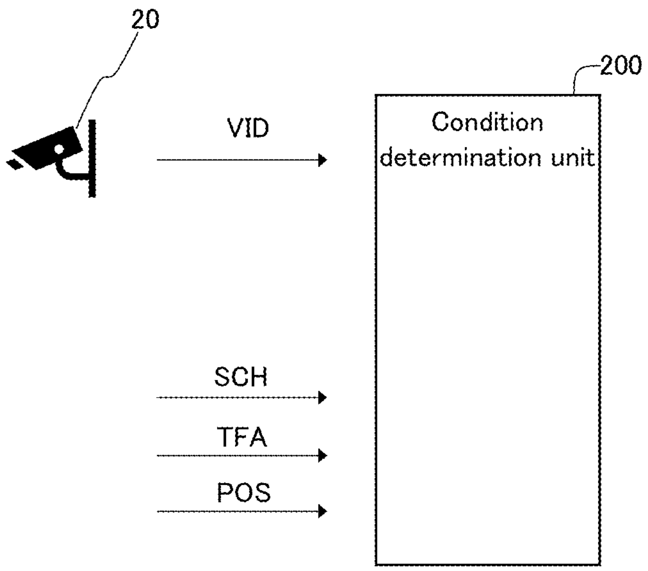
FIG. 2 is a conceptual diagram for explaining a condition determination process in the video distribution system.

FIG. 2 is a conceptual diagram for explaining a condition determination process in the video distribution system 1. The condition determination process refers to a process to determine whether the viewing recommendation condition described above is satisfied. The condition determination process is performed by a condition determination unit 200 included in the video distribution system 1. Examples of the viewing recommendation condition are described below.

As an example of the viewing recommendation condition, a first condition, associated with a start timing when an activity in which the target T is scheduled to participate, is considered. The activity in which the target T is scheduled to participate is typically a class, if the target T is a student. For example, the condition determination unit 200 determines that the viewing recommendation condition is satisfied in conjunction with the start timing of the class. "In conjunction with" may means the exact time (simultaneous) when the class actually starts, and also a timing when the activity is starting within a predetermined period of time (for example, three minutes before the class starts). The condition determination unit 200 executes the condition determination process based on the schedule information SCH, which is related to a schedule in which the target T participates. The schedule information SCH includes information on such as when each class starts and ends based on the timetable, where each class takes place, etc.

As another example of the viewing recommendation condition, a second condition based on the video VID captured by the camera 20 is considered. In this case, the condition determination unit 200 acquires the video VID and analyzes it. As an example of the viewing recommendation condition based on the video VID, a predetermined action that the target T in the video VID takes is exemplified. The "predetermined action" includes raising hands or speaking in class, talking with a teacher, playing a musical instrument, etc. Another example of the viewing recommendation condition based on the video VID is that a predetermined situation is captured in the video VID. This condition can be referred to as a third condition. The "predetermined situation" includes situations where the target T is involved in a fight, an earthquake occurs, etc., excluding situations derived from actions of the target T.

When the condition determination process is executed based on the video VID, the condition determination unit 200 determines whether the subject in the video VID is the target T. Therefore, the condition determination unit 200 needs to acquire the target feature amount information TFA to recognize the target T. The target feature amount information TFA includes information related the target's face, skeleton, voice, etc. Accordingly, the condition determination unit 200 can determine that the target T is present in the video VID, the target T is speaking, etc. In addition, the pose information POS acquired with a motion capture is required in a case where specific actions or poses are recognized. The pose information POS, for instance, includes 3D data of the skeleton when the target T raises a hand, plays a musical instrument, etc.

The schedule information SCH, the target feature amount information TFA, the pose information POS exemplified above can also be referred to as condition determination information. The user U inputs condition determination information (for example, a timetable of a school of the target T, or data of an image or voice of the target T) through the user interface. The user terminal 30 transmits the condition determination information input by the user U to the management device 100. The condition determination unit 200 acquires condition determination information from the management device 100 and uses the information for condition determination process.

Further, the user U can preset the viewing recommendation condition. As in the case of the input of the condition determination information, the information of the viewing recommendation condition input by the user U is transmitted to the management device 100 via the user interface and the user terminal 30. The condition determination unit 200 acquires information indicating the viewing recommendation condition preset by the user U with the management device 100 and determines whether the viewing recommendation condition is satisfied. Thus, a specific viewing recommendation condition corresponding to the user U's preference can be set. For example, the user U can individually set ON/OFF of the notification N for each class or can set to provide the notification N for raising hands or speaking during any class regardless of what class takes place.

1-3. Configuration of Management Device

Figure 3:
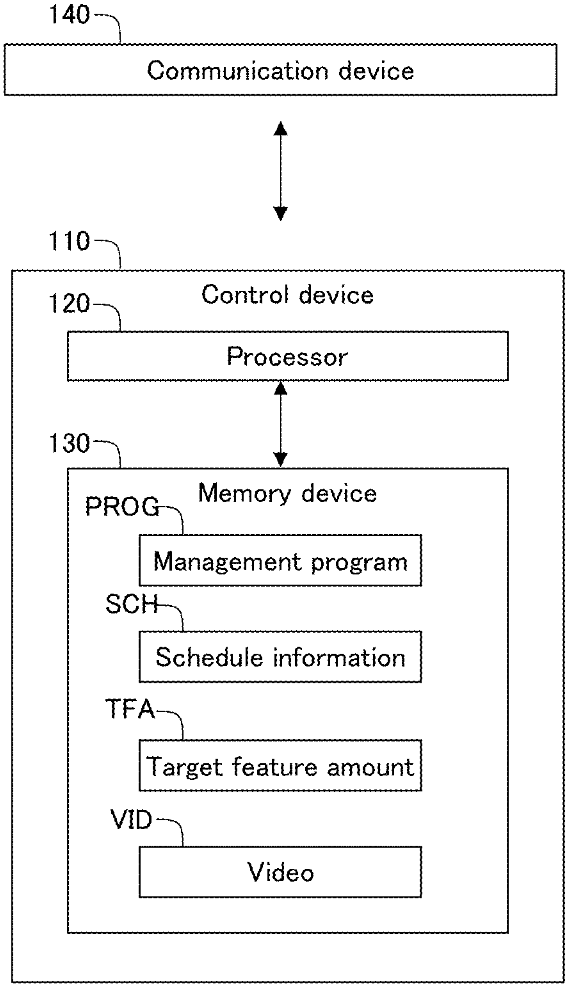
FIG. 3 is a block diagram showing an example of a configuration of a management device.

FIG. 3 is a block diagram showing an example of a configuration of the management device 100. The management device 100 includes a control device 110 and a communication device 140.

The communication device 140 communicates with the user terminal 30 and the camera 20.

The control device 110 controls the management device 100. The control device 110 includes one or more processors 120 (hereinafter, simply referred to as a processor 120) and one or more memory devices 130 (hereinafter, simply referred to as a memory device 130). The processor 120 executes various processes. For example, the processor 120 includes a central processing unit (CPU). The processor 120 may also be referred to as processing circuitry. The memory device 130 stores various kinds of information necessary for processes executed by the processor 120. Examples of the memory device 130 include a volatile memory, a nonvolatile memory, a hard disk drive (HDD), and a solid-state drive (SSD).

The management program PROG is a computer program executed by the processor 120. The processor 120 executes the management program PROG, thereby realizing the function of the control device 110. The management program PROG is stored in the memory device 130. Alternatively, the management program PROG may be stored in a computer-readable recording medium. The management program PROG may be provided via a network.

The control device 110 communicates with the camera 20 and the user terminal 30 via the communication device 140. The control device 110 acquires the video captured by the camera 20 and stores the acquired video in the memory device 130.

The memory device 130 stores condition determination information necessary for the condition determination unit 200 to determine whether the viewing recommendation condition is satisfied. As described above, the condition determination information includes the schedule information SCH, the target feature amount information TFA, the pose information POS, etc.

Further, the control device 110 functions as the condition determination unit 200 described above. In this case, the control device 110 executes the condition determination process based on the condition determination information acquired from the memory device 130. When the viewing recommendation condition is satisfied, the control device 110 provides the user terminal 30 with the notification N indicating that the specific viewing recommendation condition is satisfied. The notification N is provided via the communication device 140.

The control device 110 provides the user terminal 30 with selection request information REQ, presenting a plurality of options including viewing the video VID live and viewing the video VID later in a recorded form, in conjunction with the provision of the notification N. The user terminal 30 transmits the user response RES input by the user U to the management device 100.

Figure 4:
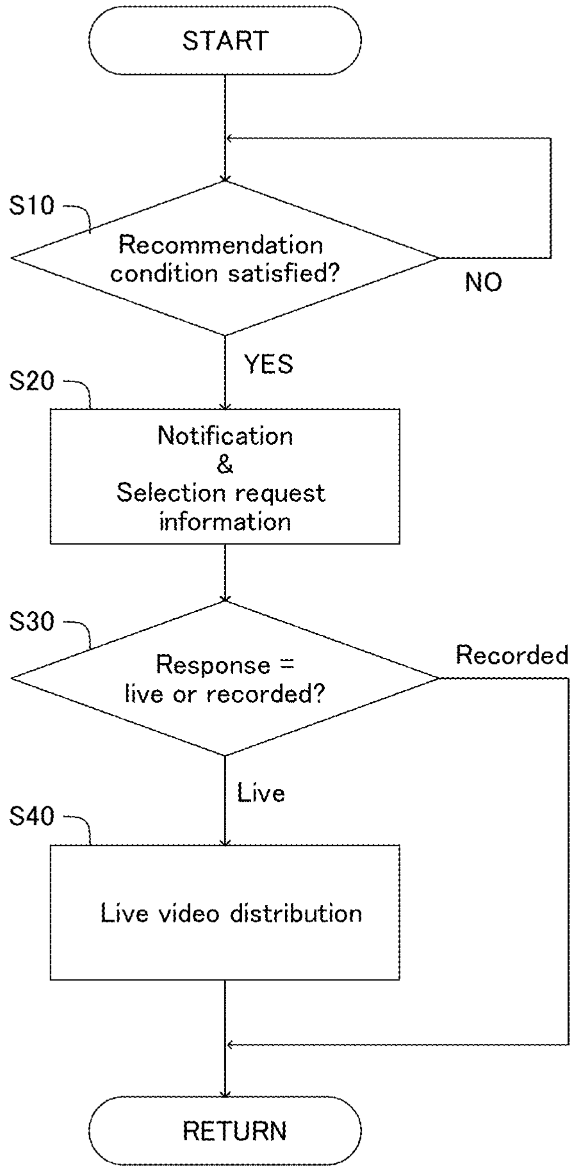
FIG. 4 is a flowchart showing an example of a process path of the video distribution system.

FIG. 4 is a flowchart illustrating an example of a process path of the video distribution system 1. In the step S10, the processor 120 executes the condition determination process to determine whether the viewing recommendation condition is satisfied. When the viewing recommendation condition is satisfied (the step S10; Yes), the process goes on the step S20. On the other hand, when the viewing recommendation condition is not satisfied (the step S10; No), the process returns to the step S10.

In the step S20, the processor 120 provides the notification N indicating that the viewing recommendation condition is satisfied to the user terminal 30 and provides the selection request information REQ presenting options to ask the viewing live (now) or later (recorded) in conjunction with the notification N to the user device 30.

In the step S30, the processor 120 executes process based on what the user response RES indicates. That is, when the user response RES indicates "live viewing", the processor 120 distributes the video VID to the user terminal 30 in live. On the other hand, when the user response RES indicates "to view the recorded video", the process returns to the step S10. The video VID may be always stored in the memory device 130 regardless of what the user response RES indicates. Alternatively, the recording of the video VID may be triggered with the user response RES indicating "to view the recorded video".

Further, when the user response RES is not received for a predetermined period or more after the notification N is provided, the process can go on regarding "the recorded video" is selected. Thus, even in case a class the user U preferred to view ends with the notification N overlooked, the user U is given an opportunity to view the video VID in a recorded form.

1-4. Effect

As described above, according to the present embodiment, when the viewing recommendation condition is satisfied, the selection request information REQ is provided to the user terminal 30 in conjunction with the notification N. The user U can flexibly select whether to view the video VID live or later in a recorded form with the user response RES according to the situation of the user U at that time. This improves the convenience for the user U.

Further, by providing a means enabling the user to view the video VID later, the timing of the video viewing can be distributed (equalized) in the entire video distribution system 1 including other users. This suppresses the number of parallel streaming due to the live distribution, which contributes to proper congestion control and to saving communication resources. Further, when the user U views the live video VID while he or she is away from home, a mobile communication fee is often charged depending on the communication environment. If the options of recording and live is provided, the communication cost can be decreased since the user U can use fixed-rate communication at home.

2. Notification and Selection 2-1. Example of Notification Screen

Figure 5:
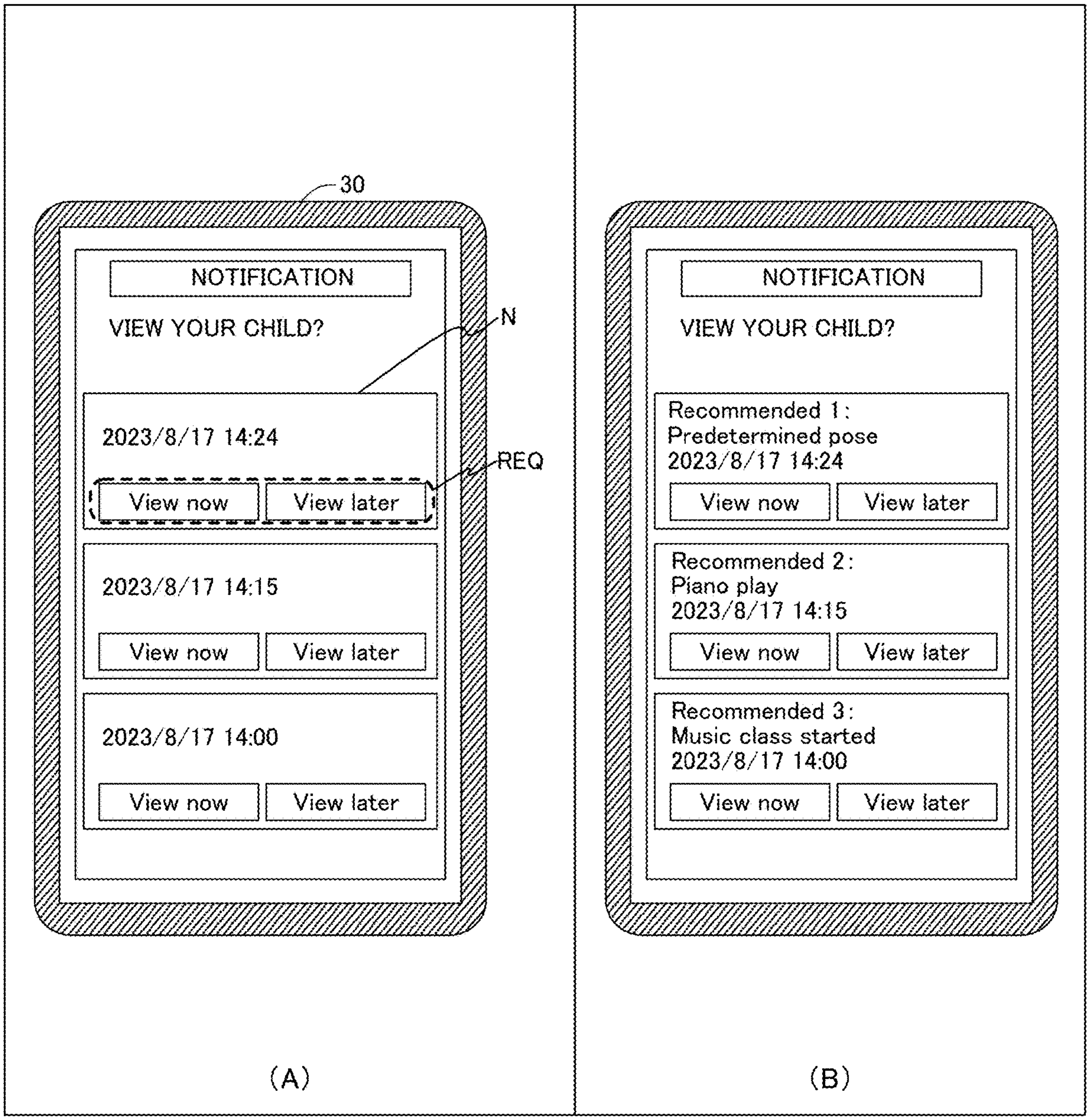
FIG. 5 is a schematic diagram showing an example of a screen of a user terminal on which notification and selection request information are displayed.

FIG. 5 is a schematic diagram showing an example of a screen of the user terminal 30 on which the notification N and the selection request information REQ are displayed. Here, the user terminal 30 is depicted as the user U's smartphone. As shown in the figure, selection request information REQ (options of "view now" and "view later") associated with the notification N is provided. When the user U taps either "view now" or "view later", the user response RES is sent to the management device 100. The icons of "view now" and "view later" correspond to the user responses RES of "viewing the video VID live" and "viewing the video VID later in a recorded form", respectively.

In the example shown in part A of FIG. 5, the time at which the notification N is provided and the selection request information REQ are displayed. By providing those options: "view now" and "view later", the user U can more easily (flexibly) select to view the video VID live or later in a recorded form in accordance with how busy the user is. In part B of FIG. 5, in addition to the time and the selection request information REQ, the contents of the satisfied viewing recommendation conditions are displayed (a predetermined pose, a piano play, and a music class started). When the content of the viewing recommendation condition (that is, the reason why the video viewing is recommended) is displayed together with the options, the user U can more properly decide which option to take, since more information helping to decide is displayed.

The followings are also conceivable as examples of notification screens (not shown in the drawings). For example, an image (a still image clipped from the video VID) when the viewing recommendation condition is satisfied may be displayed as a thumbnail in conjunction with the notification N. Thus, the user U can easily grasp what is present in the video VID and can more easily decide which option to take.

If a new viewing recommendation condition is satisfied before a user response RES to certain selection request information REQ is made, a new notification N and selection request information REQ are additionally displayed on the screen. Typically, the notification N and the selection request information REQ are displayed in chronological order with reference to the timing at which the viewing recommendation condition is satisfied.

2-2. Notification Deletion Condition

The notification N is deleted when a specific condition is satisfied. This condition is referred to as a notification deletion condition. An example of the notification deletion condition and a corresponding process executed when the condition satisfied are described below.

The notification deletion condition may be that the viewing recommendation condition that has triggered provision of the notification N is no longer satisfied. For example, in case the viewing recommendation condition is associated with the start of a class, the notification is deleted in conjunction with the end of the class. When the viewing recommendation condition is piano playing action, the notification is deleted in conjunction with the end of the piano play. The notification deletion condition may be that the user response RES is not made even when a predetermined period passed since the notification N is provided.

The maximum number of notifications N displayed on the user terminal 30 may be set in advance. In this case, the notification deletion condition is that the number of displayed notifications N reaches the set number, and the notifications N are deleted in accordance with a notification deletion order.

A typical example of the notification deletion order is the time sequence. In this case, older notifications are deleted first. Alternatively, the notification N may be deleted based on an order different from the time sequence. As an example of this case, a method based on the viewing recommendation condition preset by the user U, a viewing history, or a selection history to the notification N is exemplified. For example, it is supposed that the user U has preset the start of a physical education and a music class as the viewing recommendation condition. In this case, if the user U has more often viewed the videos of music classes, the notification N regarding music class tends to be kept (not deleted), while the one regarding physical education class tend to be deleted.

3. Video Handling 3-1. Storing Video and Viewing Recorded Video

As described above, the data of the video VID is stored in the memory device 130. The user U can view the video obtained by extracting a part of the stored video VID with the user terminal 30 on demand. Specifically, the control device 110 receives a request to view the recorded video VID from the user U (via the user terminal 30). The control device 110 transmits the extracted part of the video VID corresponding to the request to the user terminal 30.

An extracted part of the recorded video VID that can be a target of the viewing is defined as an extracted video VID-i. In order to extract a part of the video VID as the extracted video VID-i, it is necessary to set a start point and an end point of the extracted part, since the video VID is a series of videos captured by the camera 20. The start point of the extracted video VID-i is a point when the condition determination unit 200 determines that the viewing recommendation condition is satisfied. The end point of the extracted video VID-i can be set as follows.

In a case where the viewing recommendation condition for a schedule for which the timing is determined, mainly based on the schedule information SCH, is satisfied, the end of the activity can be regarded as the end point of the extracted video VID-i. In addition, in case the viewing recommendation condition is based on what is captured in the video VID, the condition determination unit 200 can regard the point when the end of the captured event is recognized as the end point of the extracted video VID-i.

The extracted video VID-i transmitted to the user terminal 30 may be appropriately edited. An example of the editing includes a highlight video obtained by extracting a part of interest (raising hand or a speaking of the target T in a class, etc.) particularly close to (matching with) the viewing recommendation condition. A slide show obtained by collecting images (clipped images) of the part of interest is also exemplified as another example. In addition, the extracted video VID-i may be transmitted with the target T enlarged. The camera 20 is basically installed with a wide angle of view so as to capture the entire space. Therefore, if the extracted video VID-i to the user U is provided with the target T enlarged, the user U can more easily grasp the state of the target T (the child of the user U). Such editing can be applied not only to the recorded video but also to the live-distributed video.

3-2. Video Deletion

When a specific deletion condition is satisfied, the stored video VID is deleted. Examples of the deletion condition include the predetermined period has passed since the storage of the video VID and the data amount of the storage reaches equal to or larger than a predetermined value. In the video deletion process, the video VID is deleted as a unit of the extracted video VID-i. In this case, different deletion conditions may be set for the extracted videos VID-i. Some specific examples are shown below.

Figure 6:
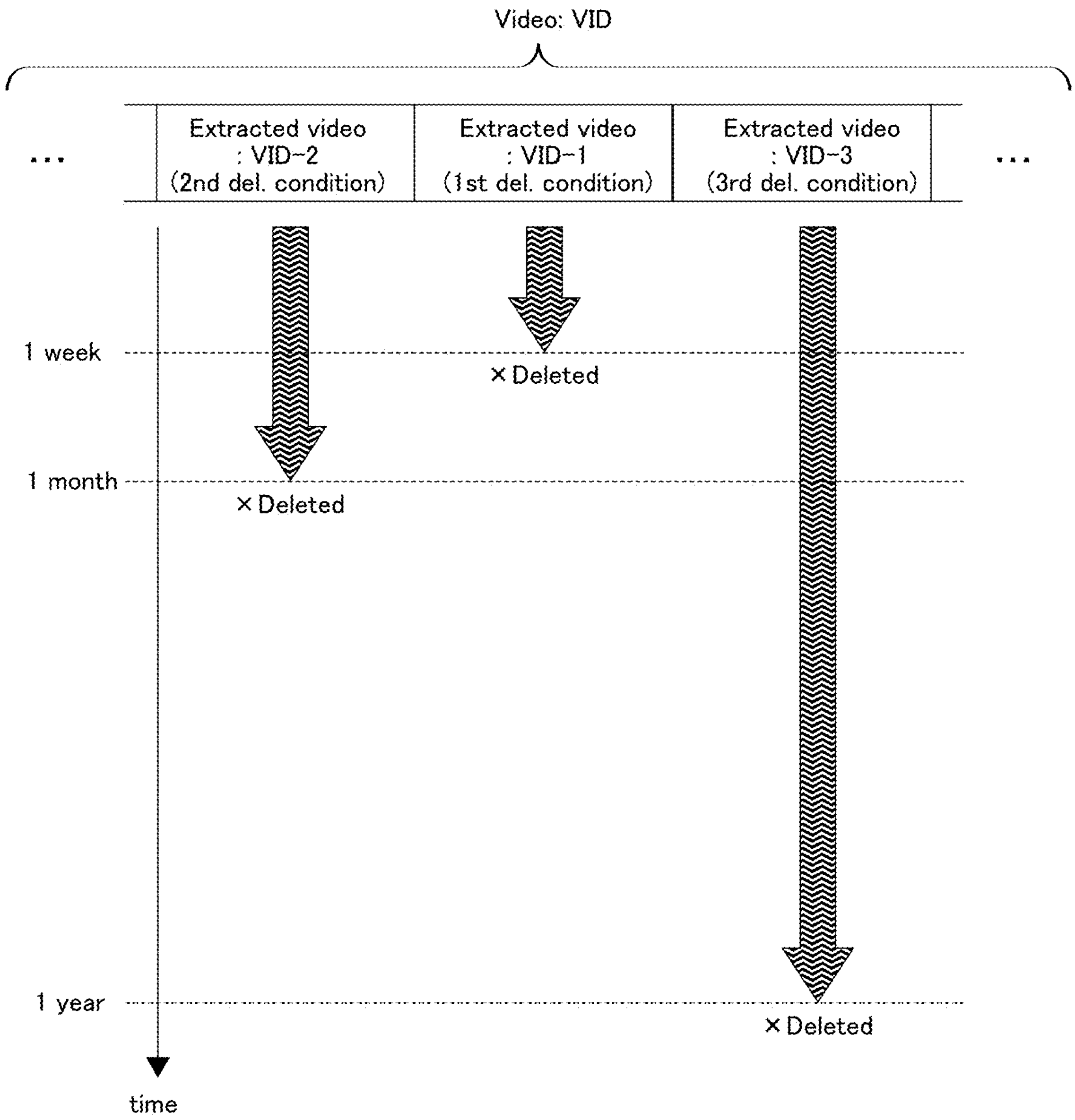
FIG. 6 is a conceptual diagram for explaining an example of deletion conditions for some extracted videos.

FIG. 6 is a conceptual diagram for explaining an example of a deletion condition of the extracted video VID-i. The extracted videos VID-1 to VID-3 are, for example, videos of each class on a certain day. Here, the extracted video VID-1 is a video that does not satisfy the viewing recommendation condition. The extracted video VID-2 is a video that satisfies the viewing recommendation condition, and that the user U has selected to view live. The extracted video VID-3 is a video that satisfies the viewing recommendation condition, and that the user U has selected to view in record. The deletion conditions set for the extracted videos VID-1 to VID-3 are referred to as a first deletion condition, a second deletion condition, and a third deletion condition, respectively. In this example, it is assumed that the first to third deletion conditions are set based on the time which has passed since the video storage. The first deletion condition is set to be one week passed since the video storage, the second deletion condition is set to be one month passed since the video storage, and the third deletion condition is set to be one year passed since the video storage.

Therefore, the extracted video VID-1 is deleted one week after the extracted video VID-1 is stored according to the first deletion condition. Similarly, the extracted video VID-2 and the extracted video-3 are deleted one month (second deletion condition) and one year (third deletion condition) after being stored, respectively. That is, the storage period of the extracted video VID-1 which is considered to have relatively small needs of the user U is set to be the shortest. The storage period of the extracted video VID-3 which is considered to have the most likely to be viewed in a recorded form is set to be the longest. By setting the deletion condition as described above, it is possible to set the storage period for each extracted video VID-i obtained by dividing the series of the video VID, and thus, it is possible to contribute to appropriate management of the data storage amount according to the needs of the user U.

Here, the extracted video VID-3 may include not only a case where the user U actively selects the record viewing but also a case where the user U is regarded to select the recording viewing because the user response RES is not received for a predetermined period or more in response to the notification N, as described in Section 1-3. Thus, even in a case where the class has ended without the user U checking the notification N and the notification N has been deleted, the user U has still an opportunity to view the recorded video for a long period of time.

What is claimed is:

1. A video distribution system that distributes a video of an area where a target is present, the video distribution system comprising processing circuitry configured to:

when a specific viewing recommendation condition is satisfied, provide a notification indicating that the specific viewing recommendation condition is satisfied to a user terminal of a user;

provide selection request information to the user terminal in conjunction with providing the notification, wherein the selection request information presents a plurality of options including viewing the video live and viewing the video later in a recorded form;

distribute the video live to the user terminal when a user response indicating selection of the viewing the video live is received from the user terminal;

in response to failing to receive the user response for a predetermined period of time after providing the notification, store the video in the recorded form for later viewing;

store the video in a memory; and delete the video from the memory in accordance with a deletion condition, wherein the deletion condition sets a time period after which the video should be deleted, wherein when the specific viewing recommendation condition is satisfied and no user response is received for a predetermined period, the time period for deletion of the video is set longer than that with the user response indicating selection of the viewing the video live.

2. A video distribution system that distributes a video of an area where a target is present, the video distribution system comprising processing circuitry configured to:

when a specific viewing recommendation condition is satisfied, provide a notification indicating that the specific viewing recommendation condition is satisfied to a user terminal of a user;

provide selection request information to the user terminal in conjunction with providing the notification, wherein the selection request information presents a plurality of options including viewing the video live and viewing the video later in a recorded form;

distribute the video live to the user terminal when a user response indicating selection of the viewing the video live is received from the user terminal;

in response to failing to receive the user response for a predetermined period of time after providing the notification, store the video in the recorded form for later viewing;

store the video in a memory; and delete the video from the memory in accordance with a deletion condition, wherein the deletion condition sets a time period after which the video should be, wherein when the specific viewing recommendation condition is satisfied and no user response is received for a predetermined period, the time period for deletion of the video is set to a same duration as that with the user response indicating selection of viewing the video in the recorded form.

3. A video distribution system that distributes a video of an area where a target is present, the video distribution system comprising processing circuitry configured to:

when a specific viewing recommendation condition is satisfied, provide a notification indicating that the specific viewing recommendation condition is satisfied to a user terminal of a user;

provide selection request information to the user terminal in conjunction with providing the notification, wherein the selection request information presents a plurality of options including viewing the video live and viewing the video later in a recorded form;

distribute the video live to the user terminal when a user response indicating selection of the viewing the video live is received from the user terminal; and in response to failing to receive the user response for a predetermined period of time after providing the notification, store the video in the recorded form for later viewing;

store the video in a memory;

delete the video from the memory in accordance with a deletion condition, wherein the deletion condition sets a time period after which the video should be, wherein the time period is a first time period in response to the video failing to satisfy the specific viewing recommendation condition, the time period is a second time period in response to the video satisfying the specific viewing recommendation condition and the user response indicates selection to review the video live, and the time period is a third time period in response to the video satisfying the specific viewing recommendation condition and the user response indicates selection to review the video in the recorded form.

4. The video distribution system according to claim 3, wherein the second time period is longer than the first time period, and the third time period is longer than the second time period.

* * * * *